(12) United States Patent
Kandel et al.

(10) Patent No.: US 10,839,185 B1
(45) Date of Patent: Nov. 17, 2020

(54) MULTI-CONTEXT ENCODING AND SECURE COMMUNICATION OF DATA

(71) Applicant: CyberArk Software Ltd., Petach-Tikva (IL)

(72) Inventors: Tal Kandel, Petach-Tikva (IL); Tal Zigman, Petach-Tikva (IL); Arthur Bendersky, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 16/669,243

(22) Filed: Oct. 30, 2019

(51) Int. Cl.
 *G06K 7/10* (2006.01)
 *G06K 7/14* (2006.01)
 *G06K 19/06* (2006.01)

(52) U.S. Cl.
 CPC ......... *G06K 7/1417* (2013.01); *G06K 7/1413* (2013.01); *G06K 19/06028* (2013.01); *G06K 19/06037* (2013.01); *G06K 19/06103* (2013.01)

(58) Field of Classification Search
 CPC ... G06K 7/14; G06K 7/1417; G06K 19/06037
 USPC ..................................................... 235/462.1
 See application file for complete search history.

(56) References Cited

U.S. PATENT DOCUMENTS

| | | | |
|---|---|---|---|
| 9,646,101 B1* | 5/2017 | Wu ........................ | G06F 16/954 |
| 2008/0121688 A1* | 5/2008 | Harrop .............. | G06K 19/06028 |
| | | | 235/375 |
| 2009/0302102 A1* | 12/2009 | Nemet ............. | G06K 19/06046 |
| | | | 235/376 |
| 2014/0263660 A1* | 9/2014 | Jiang ................ | G06K 19/06112 |
| | | | 235/491 |
| 2014/0297441 A1* | 10/2014 | Thams ............. | G06K 19/06028 |
| | | | 705/23 |
| 2017/0344776 A1 | 11/2017 | Sharma | |

(Continued)

OTHER PUBLICATIONS

Aryachandran, S. et al., "Secure Color QR Codes", IOSR Journal of Computer Engineering (IOSR-JCE), National Conference in Emerging Technologies '14 (NCET), pp. 77-85.

(Continued)

*Primary Examiner* — Ahshik Kim
(74) *Attorney, Agent, or Firm* — Finnegan, Henderson, Farabow, Garrett & Dunner LLP

(57) ABSTRACT

Disclosed embodiments relate to systems and methods for securely communicating data via encoded scannable codes. Techniques include identifying data to be communicated, identifying fictive data, accessing a manipulation factor, generating a scannable code comprising codes corresponding to the data and fictive data manipulated according to the manipulation factor, and making the code available for decoding by a scanning device. Further techniques include scanning a scannable code via a scanning device, separating the scannable code into multiple codes according to a manipulation factor, decoding the code(s) corresponding to the data to obtain the data, and refraining from decoding the code(s) corresponding to the fictive data. Techniques relating to other embodiments include identifying multiple data elements to be communicated, accessing multiple manipulation factors, generating a plurality of manipulated scannable codes corresponding to the data elements, and making the scannable codes available for decoding by a scanning device.

17 Claims, 9 Drawing Sheets

(56) References Cited

U.S. PATENT DOCUMENTS

2018/0253576 A1* 9/2018 Talbot ................ G06K 7/10722

OTHER PUBLICATIONS

Cvitic, F. et al., "Two Messages out of One 2D Matrix Bar Code," KSII Transactions on Internet and Information Systems, vol. 9, No. 3, Mar. 31, 2015 (16 pages).
Communication and Search Report, issued from the European Patent Office in corresponding Application No. 19213364.3-1218, dated Jun. 6, 2020 (9 pages).

* cited by examiner

MULTI-CONTEXT ENCODING AND SECURE COMMUNICATION OF DATA

BACKGROUND

With the greater incorporation of computing devices into everyday life, there is an increasing need for efficient and secure data transmission. Some methods of data transfer have been attempted, but they are insufficiently secure, user-friendly, and efficient for some applications. For example, some data transfer techniques include transfer of data via a wired connection (e.g., USB) or wirelessly (e.g., using WiFi, Bluetooth®, NFC, etc.). In some cases, these methods may not be feasible given the hardware or software limitations of the device being used. Further, these methods may not provide a secure and efficient mode of data transfer between a mobile device and a machine with which it is communicating.

Barcodes and other encoded labels permit quick data transfer between mobile devices and other computing devices. Different systems currently use a variety of barcodes to transfer data, authenticate users, or identify products. Such barcodes permit mobile devices to interact directly with computing devices to quickly receive or transfer data. For example, a mobile device can scan a barcode displayed by the computing device, decode the barcode, and thereby obtain data or instructions for transferring data. Barcodes may also be used to authorize user access to certain restricted locations or systems. Because traditional barcodes can be scanned by many devices, they present security risks, including transfer of malicious data, exposure of private information, or granting of access to an unauthorized user.

Accordingly, in view of these and other deficiencies in existing techniques, technological solutions are needed for secure communication of visual representations of data. Solutions should advantageously allow a user to securely, quickly, and efficiently transfer data from one computing device to another. Solutions should also permit multiple pieces of data to be transferred simultaneously. Such solutions should secure the data to prevent access by malicious entities, and also mislead malicious users with false (e.g., fictive or decoy) data. Solutions may also extradite an attack attempt. A computing device should be able to interact directly with another computing device, for example with a display of the computing device, to receive data or instructions for transferring the data. Advantageously, solutions should further allow the same process to be carried out by a terminal-based computing device or mobile device.

SUMMARY

The disclosed embodiments describe non-transitory computer readable media, systems, and methods for manipulation and secure communication of encoded visual representations of data. For example, in an exemplary embodiment, there may be a non-transitory computer readable medium including instructions that, when executed by at least one processor, cause the at least one processor to perform operations for manipulating and securely communicating encoded visual representations of data. The operations may comprise identifying a data element to be communicated via a unified encoded code; identifying at least one fictive data element; generating a plurality of encoded visual representations, the plurality of encoded visual representations encoding the data element and the at least one fictive data element; accessing a data manipulation factor; manipulating the plurality of encoded visual representations based on the data manipulation factor, wherein the manipulating is a reversible process that can be reversed by an external resource based on the manipulation factor; generating the unified encoded code from a combination of the manipulated plurality of encoded visual representations; and making available, for decoding, the generated unified encoded code.

According to a disclosed embodiment, the manipulation factor may comprise at least one of: a secret encrypted with a certificate associated with an identity, a rule based on time, a rule based on location, a color sequence rule, a color pattern rule, a light frequency rule, a three-dimensional rule, or a heat-based rule.

According to a disclosed embodiment, the manipulation factor may be defined in advance of the identifying the data element to be communicated via the unified encoded code.

According to a disclosed embodiment, the manipulation factor may be defined on-demand after the identifying the data element to be communicated via the unified encoded code.

According to a disclosed embodiment, the manipulation factor may be dynamically configurable by a security server.

According to a disclosed embodiment, the operations may further comprise separating the data element into a plurality of sub-elements and including the plurality of sub-elements in the plurality of encoded visual representations.

According to a disclosed embodiment, manipulating the plurality of encoded visual representations may comprise assigning a first color parameter defined as a valid color parameter and corresponding to the data element, and assigning a second color parameter defined as an invalid color parameter and corresponding to the at least one fictive data element.

According to a disclosed embodiment, making available, for decoding, the generated unified encoded code may include making the generated unified encoded code available to the external resource, which is configured to apply the manipulation factor and differentiate the data element from the at least one fictive data element.

According to a disclosed embodiment, the manipulation factor may specify at least one of: a color combination of the plurality of encoded visual representations, a color sequence of the plurality of encoded visual representations, or one or more colors to ignore in the plurality of encoded visual representations.

According to a disclosed embodiment, the operations may further comprise receiving the manipulation factor from a security server, and wherein the security server is configured to provide the manipulation factor to the external resource, which is configured to decode the generated unified encoded code.

According to another disclosed embodiment, a method may be implemented for manipulating and securely communicating encoded visual representations of data. The method may comprise identifying a data element to be communicated via a unified encoded code; identifying at least one fictive data element; generating a plurality of encoded visual representations, the plurality of encoded visual representations encoding the data element and the at least one fictive data element; accessing a data manipulation factor; manipulating the plurality of encoded visual representations based on the data manipulation factor, wherein the manipulating is a reversible process that can be reversed by an external resource based on the manipulation factor; generating the unified encoded code from a combination of the manipulated plurality of encoded visual representations; and making available, for decoding, the generated unified encoded code.

According to a disclosed embodiment, the at least one fictive data element may be a nonce value.

According to a disclosed embodiment, the at least one fictive data element may be configured to cause transmission, upon decoding, of a report to a security server.

According to a disclosed embodiment, the transmission may occur based on a hyperlink within the at least one fictive data element.

According to a disclosed embodiment, the external resource may be configured to apply the manipulation factor to differentiate the encoded data element from the encoded at least one fictive data element and decode the encoded data element to yield the data element.

According to a disclosed embodiment, the external resource may be configured to, based on the manipulation factor, not decode the encoded at least one fictive data element.

According to a disclosed embodiment, the manipulating the plurality of encoded visual representations may comprise selecting from an available set of valid and invalid colors to use in the manipulating.

According to a disclosed embodiment, the manipulating the plurality of encoded visual representations may comprise selecting from an available set of color alteration settings to use in the manipulating.

According to a disclosed embodiment, the making available the generated unified encoded code may comprise generating a visual display of the generated unified encoded code.

According to a disclosed embodiment, the making available the generated unified encoded code may comprise electronically transmitting the generated unified encoded code.

According to another disclosed embodiment, there may be a non-transitory computer readable medium including instructions that, when executed by at least one processor, cause the at least one processor to perform operations for generating and communicating multi-context encoded visual representations of data. The operations may comprise identifying a first data element having a first usage context; identifying a second data element having a second usage context different from the first usage context; generating a first encoded visual representation of the first data element; manipulating the first encoded visual representation of the first data element according to a first manipulation factor; generating a second encoded visual representation of the second data element; manipulating the second encoded visual representation of the second data element according to a second manipulation factor; and making available, for decoding, the manipulated first and second encoded visual representations.

According to a disclosed embodiment, the first data element may include at least a portion of authentication data for use in an authentication process for a first application.

According to a disclosed embodiment, the second data element may include at least a portion of authentication data for use in an authentication process for a second application.

According to a disclosed embodiment, the first data element may include application data for use by a first application.

According to a disclosed embodiment, the second data element may include application data for use by a second application.

According to a disclosed embodiment, the first data element may include a first code segment.

According to a disclosed embodiment, the second data element may include a second code segment.

According to a disclosed embodiment, the first data element may include at least a portion of authentication data for use in a first phase of an authentication process.

According to a disclosed embodiment, the second data element may include at least a portion of authentication data for use in a second phase of the authentication process.

According to a disclosed embodiment, the first data element may include first application data for use by a first operation of an application, and the second data element may include second application data for use by a second operation of the application.

According to another embodiment, a method may be implemented for receiving and decoding multi-context encoded visual representations of data. The method may comprise scanning, at a personal computing device, a manipulated first encoded visual representation of a first data element, the manipulation having been performed according to a first manipulation factor; scanning, at the personal computing device, a manipulated second encoded visual representation of a second data element, the manipulation having been performed according to a second manipulation factor; applying, at the personal computing device, the first and second manipulation factors to differentiate the manipulated first encoded visual representation from the manipulated second encoded visual representation; decoding, at the personal computing device, the manipulated first encoded visual representation to yield the first data element; decoding, at the personal computing device, the manipulated second encoded visual representation to yield the second data element; utilizing the first data element in a first usage context; and utilizing the second data element in a second usage context.

According to a disclosed embodiment, the first and second manipulation factors may be defined by a common manipulation scheme.

According to a disclosed embodiment, at least one of the first or second manipulation factors may define a color to use for at least one of the first or second encoded visual representations.

According to a disclosed embodiment, at least one of the first or second manipulation factors may define a color sequence to use for at least one of the first or second encoded visual representations.

According to a disclosed embodiment, at least one of the first or second manipulation factors may define a display frequency to use for at least one of the first or second encoded visual representations.

According to a disclosed embodiment, before the scanning of the manipulated first and second encoded visual representations, the first and second encoded visual representations may be received as a single composite encoded visual representation.

According to a disclosed embodiment, the method may further comprise separating the manipulated first and second encoded visual representations from each other, from the single composite encoded visual representation.

According to a disclosed embodiment, the separating may be performed based on the first and second manipulation factors.

According to a disclosed embodiment, the method may further comprise receiving, from a security server, the first and second manipulation factors.

According to a disclosed embodiment, the manipulated first and second encoded visual representations may be made available for the scanning by the personal computing device from the security server.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of manipulating and securely communicating encoded visual representations of data described herein overcome several technological problems relating to security and efficiency of data communications between devices. As described below, the disclosed embodiments provide techniques for a computing device to securely communicate data to a scanning device through one or more manipulated encoded visual representations. The computing device may identify both a data element to be communicated and a fictive (e.g., nonce, decoy, etc.) data element. The computing device may then generate a plurality of encoded visual representations encoding the data element and the fictive data element. Using a manipulation factor, the computing device may then manipulate the encoded visual representations. The computing device may then generate a unified encoded visual representation that it may then make available for decoding. Then, the scanning device may receive the unified encoded visual representation and use the manipulation factor to differentiate the visual representations for the data element and the fictive data element. The scanning device may then decode the encoded legitimate data element, and ignore any fictive data elements. In some embodiments, the disclosed techniques may be used to communicate multiple data elements simultaneously or in a single (e.g., merged, concatenated, or unified) encoded visual representation. Thus, the computing device may securely and quickly communicate data by providing a manipulated Quick Response (QR) bar code, another type of bar code, an encoded image, color pattern, a periodic light frequency, a sound signal, a heat signal, a three-dimensional pattern, or other scannable code. As described below, the manipulation of the encoded code is reversable, such that the manipulation may be undone, or reversed, by a receiving computing device that scans the manipulated code.

Reference will now be made in detail to the disclosed embodiments, examples of which are illustrated in the accompanying drawings.

Figure 1:
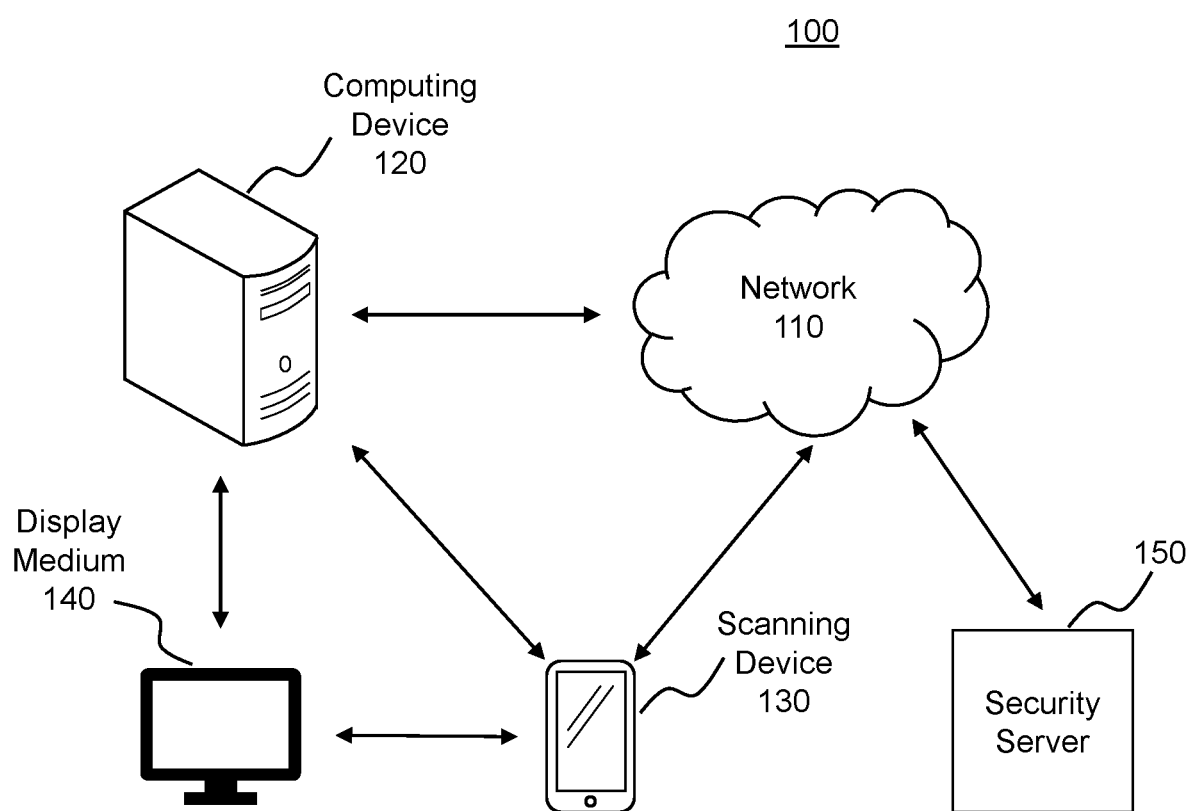
FIG. 1 is a block diagram of an exemplary system for securely communicating data from a computing device to a scanning device in accordance with disclosed embodiments.

FIG. 1 is a block diagram of an exemplary system for securely communicating data from a computing device to a scanning device. System 100 may include a network 110, one or more computing device 120, one or more scanning device 130, one or more display medium 140, and one or more security server 150 as shown in FIG. 1.

Computing device 120 may include a variety of different computing devices, including those capable of communicating over a network and those configured for short-range device-to-device communications. For example, computing device 120 may be a personal computer (e.g., a desktop or laptop), an IoT device (e.g., sensor, smart home appliance, printer, connected vehicle, industrial device, etc.), a server, a mainframe, a vehicle-based or aircraft-based computer, a virtual machine (e.g., virtualized computer, container instance, etc.), or similar. Computing device 120 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), ATM, connected kiosk (e.g., a ticketing kiosk, automated checkout, vending machine, roadside toll booth, bikeshare station, etc.), connected physical access point (e.g., a door lock, gate, road barrier, etc.), shared vehicle (e.g., Zipcar™, motorized scooter, bicycle, etc.) or various other devices capable of processing and/or receiving data.

In certain embodiments, computing device 120 may be a terminal-based (e.g., Unix or Linux) computing device. For example, the computing device 120 may provide only a terminal interface for interacting with the system. In some embodiments, by contrast, computing device 120 may operate using a visual operating system, such as a Windows™ operating system, Apple™ operating system, Android™ operating system, a cloud-based operating system (e.g., through AWS™, Azure™, IBM Cloud™, etc.), or other types of non-terminal operating systems.

Computing device 120 may be in communication with scanning device 130 (e.g., mobile computing device) and/or display medium 140, as shown in FIG. 1. Computing device 120 may communicate with scanning device 130 directly, for example, through nearfield communications (e.g., Bluetooth, infrared, RFID, light patterns, sound signals, etc.). Alternatively, or in addition, computing device 120 may communicate with scanning device 130 through display medium 140 by presenting a code for the scanning device 130 to scan. Alternatively, or in addition, computing device 120 may communicate with scanning device 130 over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols.

Scanning device 130 may be any device or external resource capable of scanning encoded content, such as a machine-readable code or image, light pattern, sound signal, temperature pattern, or other code. For example, scanning device 130 may be a personal computing device, such as a mobile phone, a tablet, a laptop, an e-reading device, a handheld gaming device, a digital camera, a mobile PC, a digital calculator, or the like. Scanning device 130 may also be a wearable device, such as a smart watch, a fitness tracker, smart jewelry or various other wearable devices. In some embodiments, scanning device 130 may be a device with a dedicated scanning functionality, such as a handheld image or document scanner. Scanning device 130 may also be a stationary device, such as a desktop or laptop computer with an auxiliary scanning component in communication with the device.

Display medium 140 may be an electronic screen (e.g., LCD screen, LED screen, OLED screen, plasma screen, etc.), a physical printed depiction (e.g. a printed receipt, printed photo, sticker, etc.), lights, or the like. For example, in a situation where a user of scanning device 130 is seeking access to an access-restricted room controlled by computing device 120, display medium may be a screen on a wall outside of the room that is configured to display the encoded code for scanning. Alternatively, in such an embodiment display medium may be configured to generate a physical (e.g., printed) paper or other material comprising the encoded code. In some embodiments, accordingly, display medium 140 may include a printer to generate printed visual representations on demand.

System 100 may also comprise one or more security servers 150 in communication with network 110. Security server 150 may manage the various elements of system 100. In some embodiments, security server 150 may be configured to process and manage requests between computing device 120 and scanning device 130. In some embodiments, as described in greater detail below, security server 150 may generate manipulation factors used for secure data transfer. Security server 150 may also manage security threats and access to restricted systems. For example, in response to receiving a security report, security server 150 may deny system access to, or extradite an attack attempt by, an unauthorized device (e.g., unauthorized scanning device 130).

Figure 2A:
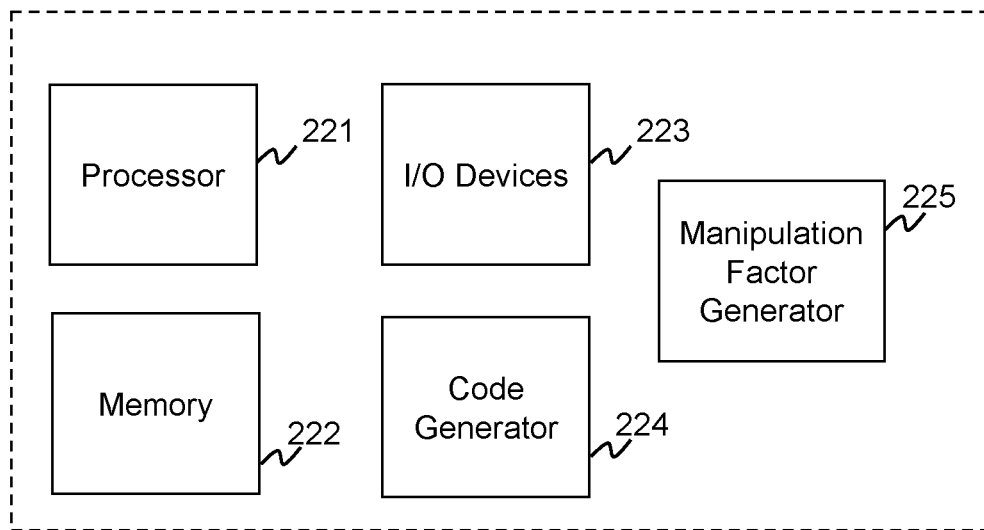
FIG. 2A is a block diagram showing an exemplary computing device in accordance with disclosed embodiments.

FIG. 2A is a block diagram showing an exemplary computing device 120 in accordance with disclosed embodiments. Computing device 120 may include one or more processors 221, one or more memories 222, one or more input/output (I/O) devices 223, one or more code generator components 224, and one or more manipulation factor generators 225. Processor (or processors) 221 may include one or more data or software processing devices. For example, the processor 221 may take the form of, but is not limited to, a microprocessor, embedded processor, or the like, or may be integrated in a system on a chip (SoC). Furthermore, according to some embodiments, the processor 221 may be from the family of processors manufactured by Intel®, AMD®, Qualcomm®, Apple®, NVIDIA®, or the like. The processor 221 may also be based on the ARM architecture, a mobile processor, or a graphics processing unit, etc. The disclosed embodiments are not limited to any type of processor configured in the computing device 120.

Memory (or memories) 222 may include one or more storage devices configured to store instructions used by the processor 221 to perform functions related to the disclosed embodiments. Memory 222 may be configured to store software instructions, such as programs, that perform one or more operations when executed by the processor 221 to securely communicate data to a scanning device 130, for example, using methods 500 and 800, described in detail below. The disclosed embodiments are not limited to particular software programs or devices configured to perform dedicated tasks. For example, the memory 222 may store a single program, such as a user-level application, that performs the functions of the disclosed embodiments, or may comprise multiple software programs. Additionally, the processor 221 may in some embodiments execute one or more programs (or portions thereof) remotely located from the computing device 120. Furthermore, the memory 222 may include one or more storage devices configured to store data for use by the programs.

Input/output devices 223 may include one or more integrated ports or stand-alone devices configured to allow data to be received and/or transferred by the computing device 120. The I/O devices 223 may include one or more network adaptors or communication devices and/or interfaces (e.g., WiFi, Bluetooth®, RFID, NFC, RF, infrared, etc.) to communicate with other machines and devices, such as with other components of system 100 through network 110. In some embodiments, the I/O devices 223 may comprise a touchscreen configured to allow a user to interact with the computing device 120, and in some embodiments, the I/O devices 223 may comprise a keyboard, mouse, trackball, touch pad, stylus, and the like.

Code generator(s) 224 may allow computing device 120 to generate a scannable code or other encoded visual representation of data, such as a QR code, a barcode, an encoded image, or another scannable code. Examples of such code formats are described further in connection with FIG. 3 below. Code generator 224 may be a separate component of computing device 120, for example, with dedicated processors and/or memories. In other embodiments, though shown separately in FIG. 2A, code generator 224 may be integrated into memory 222 and/or processor 221. For example, code generator 224 may be a software code, a script, or application stored on memory 222 and/or executed by processor 221.

Manipulation factor generator(s) 225 may allow computing device 120 to generate a manipulation factor. The manipulation factor may be used by the computing device to manipulate an encoded visual representation of data, e.g., a QR code, light pattern, encoded image, etc. The manipulation factor is described in greater detail below. Manipulation factor generator 225 may be a separate component of computing device 120, for example, with dedicated processors and/or memories. In other embodiments, though shown separately in FIG. 2A, manipulation factor generator 225 may be integrated into memory 222 and/or processor 221. For example, manipulation factor generator 225 may be a software code, a script, or application stored on memory 222 and/or executed by processor 221.

Figure 2B:
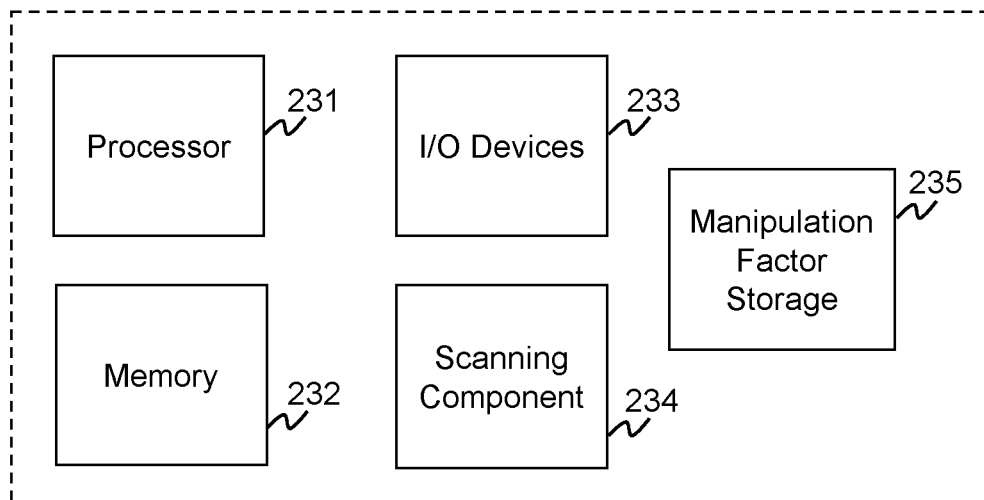
FIG. 2B is a block diagram showing an exemplary scanning device in accordance with disclosed embodiments.

FIG. 2B is a block diagram showing an exemplary scanning device 130 in accordance with disclosed embodiments. Scanning device 130 may include one or more processors 231, one or more memories 232, one or more input/output (I/O) devices 233, one or more scanning components 234, and one or more manipulation factor storage 235. As described above, scanning device 130 may be a mobile device or various other devices capable of scanning an encoded code. Similar to processor 221, as described above, processor 231 may include one or more data or software processing devices. For example, the processor 231 may include, but is not limited to, a microprocessor, embedded processor, or a processor integrated in an SoC.

Memory (or memories) 232 may include one or more storage devices configured to store instructions used by the processor 231 to perform functions related to the disclosed embodiments. The memory 232 may be configured to store software instructions, such as programs, that perform one or more operations when executed by the processor 231 to securely receive data from computing device 120, for example using methods 600 or 900, described below. Memory 232 may be similar to memory 222 described above. For example, memory 232 may include a single program, such as a user-level application, that performs the functions of the disclosed embodiments, or may comprise multiple software programs.

I/O devices 233 may also be similar to the I/O devices 223 described above for computing system 120. For example, I/O devices 233 may include one or more network adaptors or communication devices and/or interfaces (e.g., WiFi, Bluetooth®, RFID, NFC, RF, infrared, etc.) to communicate with other machines and devices, a touchscreen configured to allow a user to interact with the scanning device 130, a display, a keyboard/keypad, a mouse, a trackball, a touch pad, a stylus, sensors (e.g., gyroscopes, accelerometers, thermometers, cameras, scanners, etc.), and the like.

Scanning component 234 may be configured to capture an image (e.g., a 2D scannable code), a light pattern, a color pattern, a sound signal, a heat signal, or other types of encoded signals. Scanning component 234 may be a hardware component, such as a barcode scanning component, a camera, a document scanner, a microphone, a gyroscope, a thermometer, a pressure sensor, or the like. In some embodiments, scanning component 234 may be an auxiliary component that communicates with scanning device 130 via Bluetooth®, WiFi, USB, etc. Scanning component 234 may have a dedicated processor and/or memory for capturing, storing and processing the scanned image. In some embodiments, scanning component 234 may describe a software component, such as a code, a script, an application or other form of software, which may be stored on memory 232 and/or executed by processor 231. In such embodiments, scanning component 234 may utilize a camera or scanner included in I/O devices 233 to scan the scannable code.

Manipulation factor storage 235 may allow computing device 120 to receive a manipulation factor. The manipulation factor may be used by the scanning device 130 to manipulate an encoded visual representation of data, e.g. a QR code. The manipulation factor is described in greater detail below in connection with FIGS. 4-9. Manipulation factor storage 235 may be a separate component of scanning device 130, for example, with dedicated processors and/or memories. In some embodiments, manipulation factor storage 235 may be an auxiliary component that communicates with scanning device 130 via Bluetooth®, WiFi, USB, etc. In other embodiments, though shown separately in FIG. 2B, manipulation factor storage 235 may be integrated into memory 232 and/or processor 231. For example, manipulation factor storage 235 may be a software code, a script, or application stored on memory 232 and/or executed by processor 231.

Figure 3:
FIG. 3 is an illustration depicting exemplary visual representations of data in accordance with disclosed embodiments.
Figure 3:
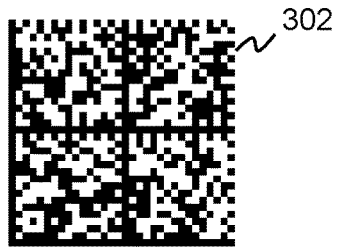
Figure 3:
Figure 3:
Figure 3:
Figure 3:
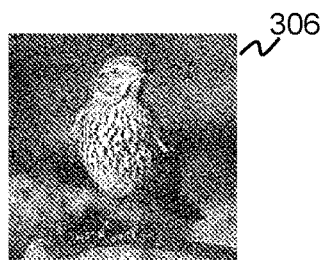
Figure 3:
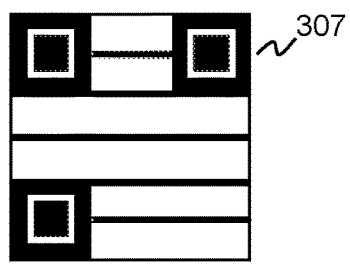
Figure 3:
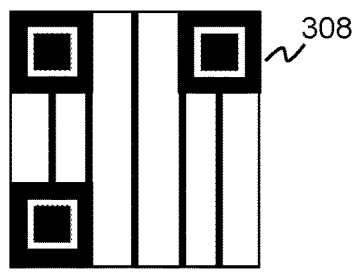
Figure 3:
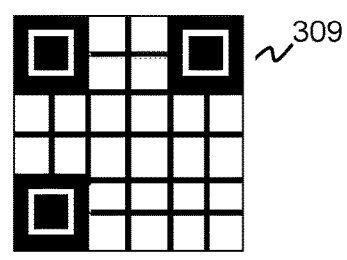
Figure 4:
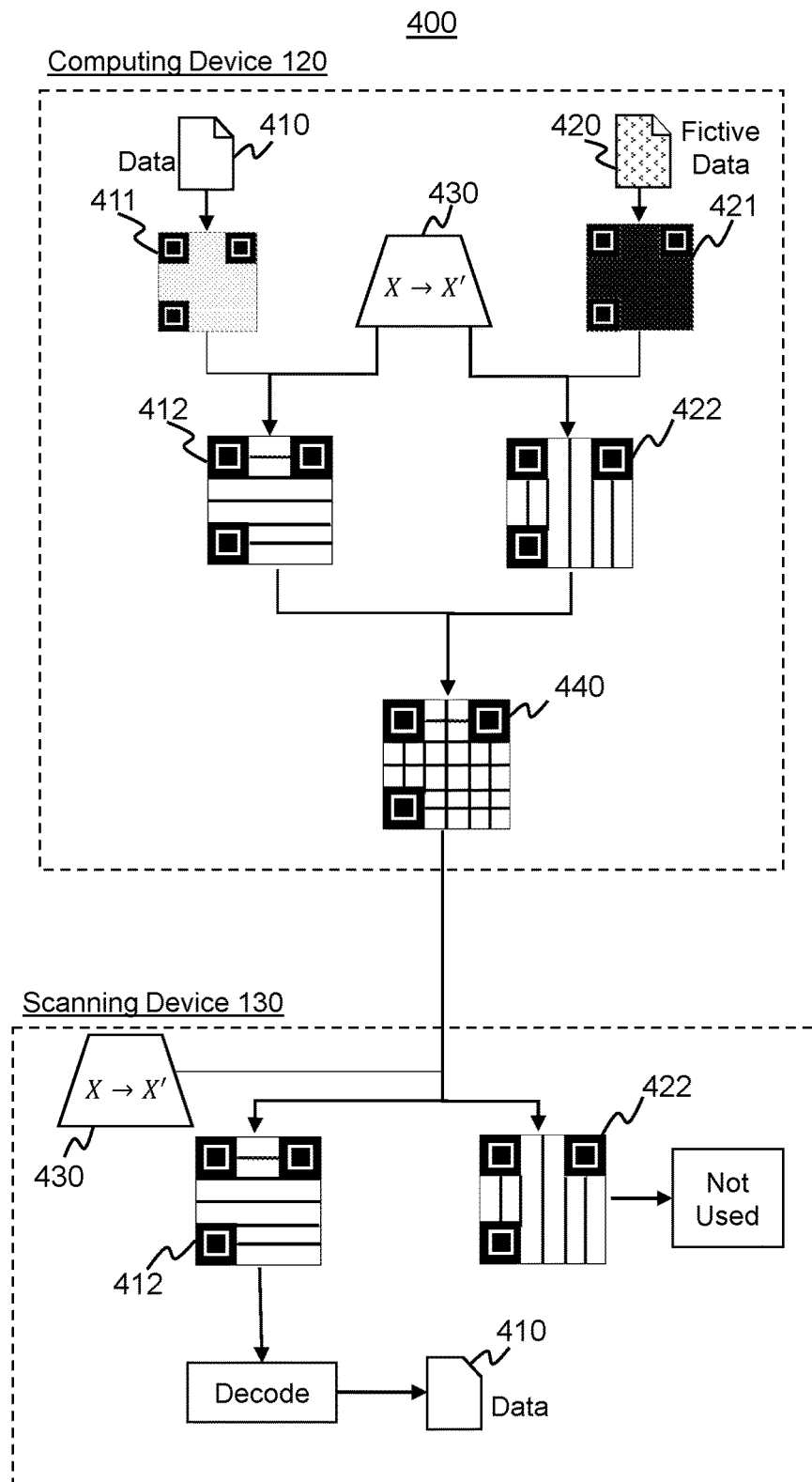
FIG. 4 is a block diagram depicting an exemplary process for securely communicating data to a scanning device in accordance with disclosed embodiments.
Figure 7:
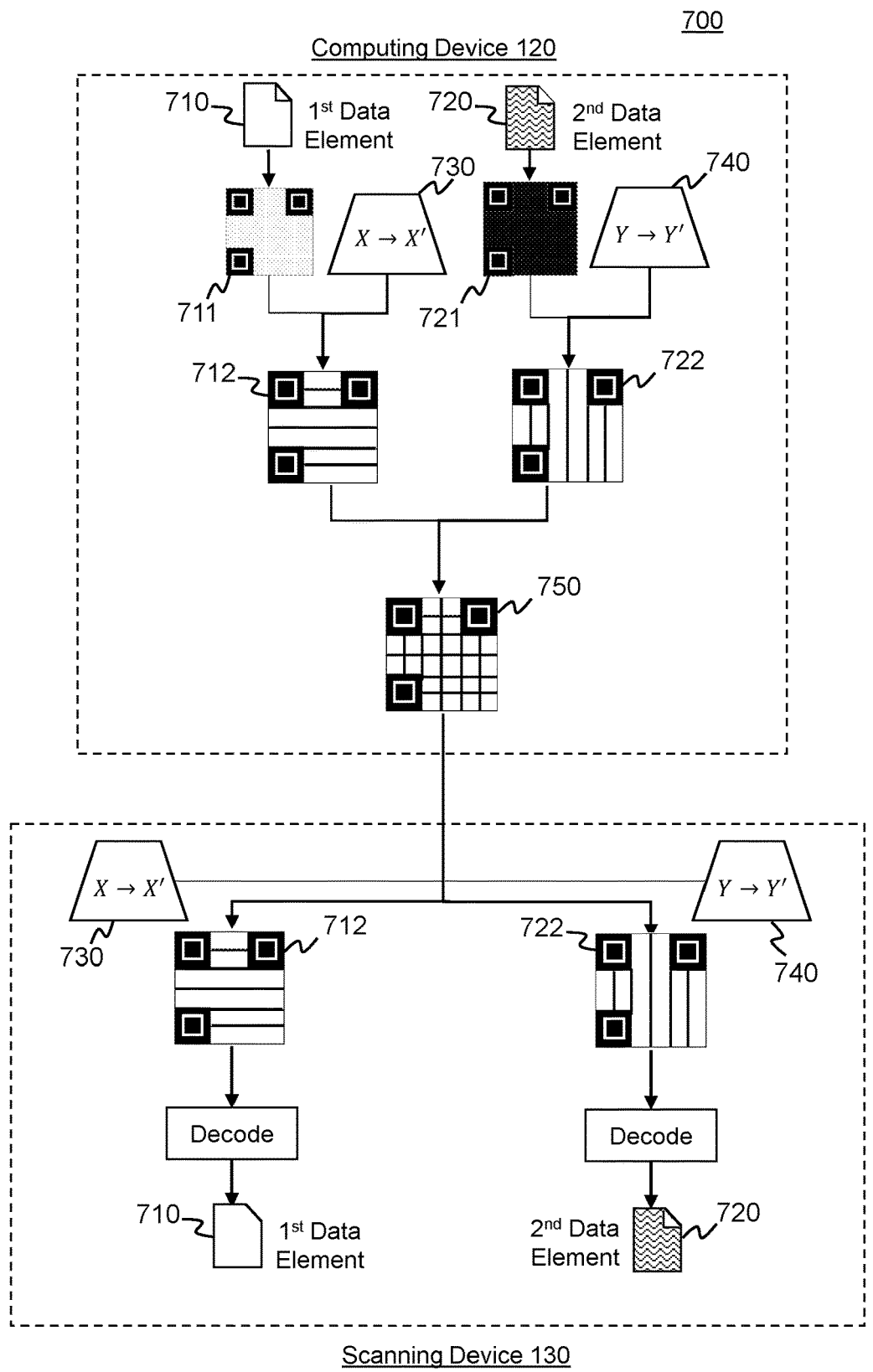
FIG. 7 is a block diagram depicting an exemplary process for securely communicating data to a scanning device in accordance with disclosed embodiments.

FIG. 3 is an illustration of exemplary encoded visual representations of data in accordance with disclosed embodiments. In some embodiments, the encoded visual representations may take the form of a scannable code. Such scannable code may be a QR code 301 or other bar code format, and thus may conform to various standards or specifications, such as ISO/IEC 18004:2015. While encoded visual representations in FIGS. 4 and 7, are shown as QR-style codes, it is understood that various other formats or techniques may be used. In addition to QR code 301, other forms of 2D scannable codes may be used, such as a data matrix 302, Aztec 303, or PDF417 305. Various other formats not shown in FIG. 3 may be used (e.g., Micro QR, MicroPDF417, CodaBlock-F, MaxiCode, Microsoft Tag, Shotcode, DotCodeetc, PM code, etc.).

In some embodiments, 1D bar codes 304, or other lower-capacity formats may also be utilized. In some embodiments, the encoded visual representation may be presented as an image 306. For example, scanning device 130 may use image processing techniques to ascertain data based on the content of the image, or the location of certain elements in the image. Computing system 120 may also be configured to embed data within or on top of image 306, for example using a digital watermark, etc. The encoded visual representation may also be a proprietary code or format that may not be readable by other systems or devices. This may provide added security to system 100.

In some embodiments, encoded visual representations may vary in color or other pattern. Encoded visual representations 307 and 308 represent two different QR codes of differing colors. In some embodiments, QR codes 307 and 308 may be combined into a multicolor combined code 309. Colored QR codes 307 and 308 may be created using a variety of color models, such as RGB, CMY, TSL, etc. In some embodiments, colored QR codes may be produced by using visual variations other than color (e.g., patterning, shading, etc.).

FIG. 4 is a block diagram depicting an exemplary process 400 for securely communicating data from a computing device 120 to a scanning device 130. Process 400 may be triggered in response to a need for scanning device 130 to receive data element 410. For example, this may occur when a user holding scanning device 130 comes into proximity with a secured room, building, vehicle, or other apparatus controlled by computing device 120 and/or security server 150. As another example, process 400 may commence when a user of scanning device 130 attempts to access a personal computing device, an operating system, an application, etc. Further, in some embodiments computing device 120 may request to provide data element 410 to the scanning device 130. Various other scenarios may trigger a need for computing device 120 to communicate data to scanning device 130.

Computing device 120 may identify fictive data element 420. Fictive data element 420 may be false decoy data, noise, a nonce value, etc. In some cases, fictive data element 420 is previously stored on computing device 120, while in other embodiments it is generated (e.g., randomly generated) on demand. Fictive data element 420 may later, as discussed below, cause transmission of a notification or alert that notifies the computing device 120, security server 150, or an administrator of suspicious user access. In some embodiments, fictive data element 420 may be configured to, upon decoding, redirect or extradite an attack attempt to prevent unauthorized access to data element 410. Fictive data element 420 may also otherwise mislead a malicious user, so as to prevent unauthorized access to data element 410. In some embodiments, fictive data element 420 may cause transmission of a report to security server 150. Such transmission may be based upon a hyperlink or other network address identifier within fictive data element 420. While FIG. 4 illustrates a single data element 410, some embodiments may include a plurality of data elements 410, as discussed below. Likewise, some embodiments may include a plurality of fictive data elements 420, as also discussed below.

Computing device 120 may also identify data element 410. The data element 410 may take several forms. For example, data element 410 may be a software activation code, an access token or key, a URL or other network address identifier, a password, a cryptographic key, a license code, textual content, or various other forms of data. What differentiates data element 410 from fictive data element 420, however, is that data element 410 is legitimate data configured or generated to be used by users of scanning device 130, whereas fictive data element 420 is not.

Once one or more data elements 410 has been accessed, computing device 120 may then generate a data encoded visual representation 411 from data element 410. Data encoded visual representation 411 may be, for example, a QR code, barcode, encoded image, light pattern, or other form of visual representation as described with respect to FIG. 3. Of course, as discussed above, non-visual forms of encoded representation 411 are possible too (e.g., sound signal, heat signal, vibration signal, etc.). In some embodiments, computing device 120 may encrypt data element 410 before generating data encoded visual representation 411. Computing device 120 may also generate a fictive data encoded visual representation 421 from fictive data element 420. Like data encoded visual representation 411, fictive data encoded visual representation 421 may be, for example, a QR code, barcode, encoded image, or other form of visual representation as described with respect to FIG. 3. In some embodiments, computing device 120 may separate data element 410 or fictive data element 420 into a plurality of sub-elements. The computing device 120 may then generate an encoded visual representation corresponding to each of the plurality of sub-elements.

Manipulation factor 430 may comprise one or more secrets or rules used to modify data element 411 and/or fictive data element 410. As discussed below, the manipulation factor 430 may be a rule associated with an identity, a rule based on time, a rule based on location, a color sequence rule, a color pattern rule, a light frequency rule, a three-dimensional rule, or a heat-based rule, etc. In some embodiments, manipulation factor 430 may comprise a set of parameters. One or more parameters may correspond to the data element 410 and one or more parameters may correspond to fictive data element 420. In some embodiments, the parameters may relate to a set of valid and invalid colors. For example, manipulation factor 430 may include a first color parameter defined as a valid color that corresponds to data element 410. Accordingly, manipulation factor 430 may also include a second color parameter defined as an invalid color that corresponds to fictive data element 420. In some embodiments, manipulation factor 430 may define parameters relating to a color combination, a color sequence, or one or more colors to ignore in encoded visual representations. In other embodiments, manipulation factor 430 may define a set of color alteration settings. For example, manipulation factor 430 may define rules altering color by brightness, hue, saturation, etc. Further, manipulation factor 420 may determine how many fictive data elements 420 to generate, whether to merge or consolidate them with data element 410, and what form of encoded data representation to use.

Manipulation factor 430 may be used by computing device 120 to implement a reversible process to convert encoded visual representations into manipulated encoded visual representations. For example, computing device 120 may use manipulation factor 430 to manipulate data encoded visual representation 411 to generate manipulated data encoded visual representation 412. Similarly, computing device 120 may use manipulation factor 430 to manipulate fictive data encoded visual representation 421 to generate manipulated fictive data encoded visual representation 422. As shown in FIG. 4, this may involve changing the colors of data encoded visual representation 411 and fictive data encoded visual representation 421 so that they have different colors, different combinations of colors, etc. For example, manipulated data encoded visual representation 412 may be green and white, while manipulated fictive data encoded visual representation 422 may be black and white. Alternatively, as discussed above, the manipulation may involve changing the content of the encoded representations as well.

Computing device 120 may be configured to generate manipulation factor 430. In other embodiments, security server 150 may generate manipulation factor 430. Security server 150 may then transmit manipulation factor 430 to computing device 120. In some embodiments, manipulation factor 430 may be defined in advance of identifying data element 410. In other embodiments, manipulation factor 430 may be defined on-demand after identifying data element 410. In some embodiments, manipulation factor 430 may be dynamically configurable by security server 150.

Computing device 120 may in some embodiments combine manipulated data encoded visual representation 412 with manipulated fictive data encoded visual representation 422 to generate unified encoded code 440. Unified encoded code 440 may be a visual representation comprising two overlaid encoded visual representations, for example a multicolor combined code 309 as illustrated in FIG. 3. Alternatively, unified encoded code 440 may combine portions of manipulated data encoded visual representation 412 and manipulated fictive data encoded visual representation 422, so that unified encoded code 440 contains portions of each encoded representation. Further, in some embodiments unified encoded code 440 is a group or set of encoded codes, where manipulated data encoded visual representation 412 and manipulated fictive data encoded visual representation 422 are displayed separately. Computing device 120 may then make unified encoded code 440 available for decoding, for example by electronically transmitting unified encoded code 440 to scanning device 130. In some embodiments, computing device 120 may cause unified encoded code 440 to be visually displayed on display medium 140, as discussed above.

Scanning device 130 may receive unified encoded code 440 from computing device 120. In some embodiments, scanning device 130 may receive unified encoded code 440 from computing device 120 via electronic transmission. In other embodiments, scanning device 130 may receive unified encoded code 440 via scanning component 234. Scanning component 234 of scanning device 130 may scan unified encoded code 440 when displayed on display medium 140. Scanning device 130 may be configured to separate unified encoded code 440 into manipulated data encoded visual representation 412 and manipulated fictive data encoded visual representation 422. For example, scanning device 130 could separate unified encoded code 440 into single-color encoded visual representations, such as those illustrated in FIG. 3.

In some embodiments, scanning device 130 may use manipulation factor 430 to separate unified encoded code 440. Manipulation factor 430 may be preexisting, received from computing device 120, received from network 110, or received from security server 150. Scanning device 130 may also use manipulation factor 430 to differentiate between the manipulated encoded visual representations (e.g., to differentiate manipulated data encoded visual representation 412 from manipulated fictive data encoded visual representation 422). Scanning device 130 may use manipulation factor 430 to reverse the manipulation process conducted by computing device 120 and thus obtain data encoded visual representation 411 and fictive data encoded visual representation 421. In some embodiments, scanning device 130 may not reverse the manipulation process on fictive data encoded visual representation 422. In some embodiments, scanning device 130 may reverse the process on both manipulated encoded visual representations, then use manipulation factor 430 to differentiate data encoded visual representation 411 and fictive data encoded visual representation 421. After obtaining data encoded visual representation 411, scanning device 130 may access data element 410 by decoding data encoded visual representation 411. Scanning device 130 may be configured, based on manipulation factor 430, to not decode encoded visual representation 421. In some embodiments, if data element 410 was separated into sub-elements, scanning device 130 may access data element 410 by decoding the encoded visual representation of each sub-element and recombining the decoded sub-elements.

In some embodiments, including those where process 400 is used to, for example, grant access to or authenticate a user, computing device 120 or security server 150 may require scanning device 130 to have network access. For example, data element 410 could include a link to a network location that scanning device 130 must access before computing device 120 or security server 150 will authorize or authenticate scanning device 130. In this way, computing device 120 or security server 150 can assure that it will be aware if scanning device 130 accesses fictive data element 420 (e.g., decodes fictive data element 420 and/or attempts to process its contents).

Figure 5:
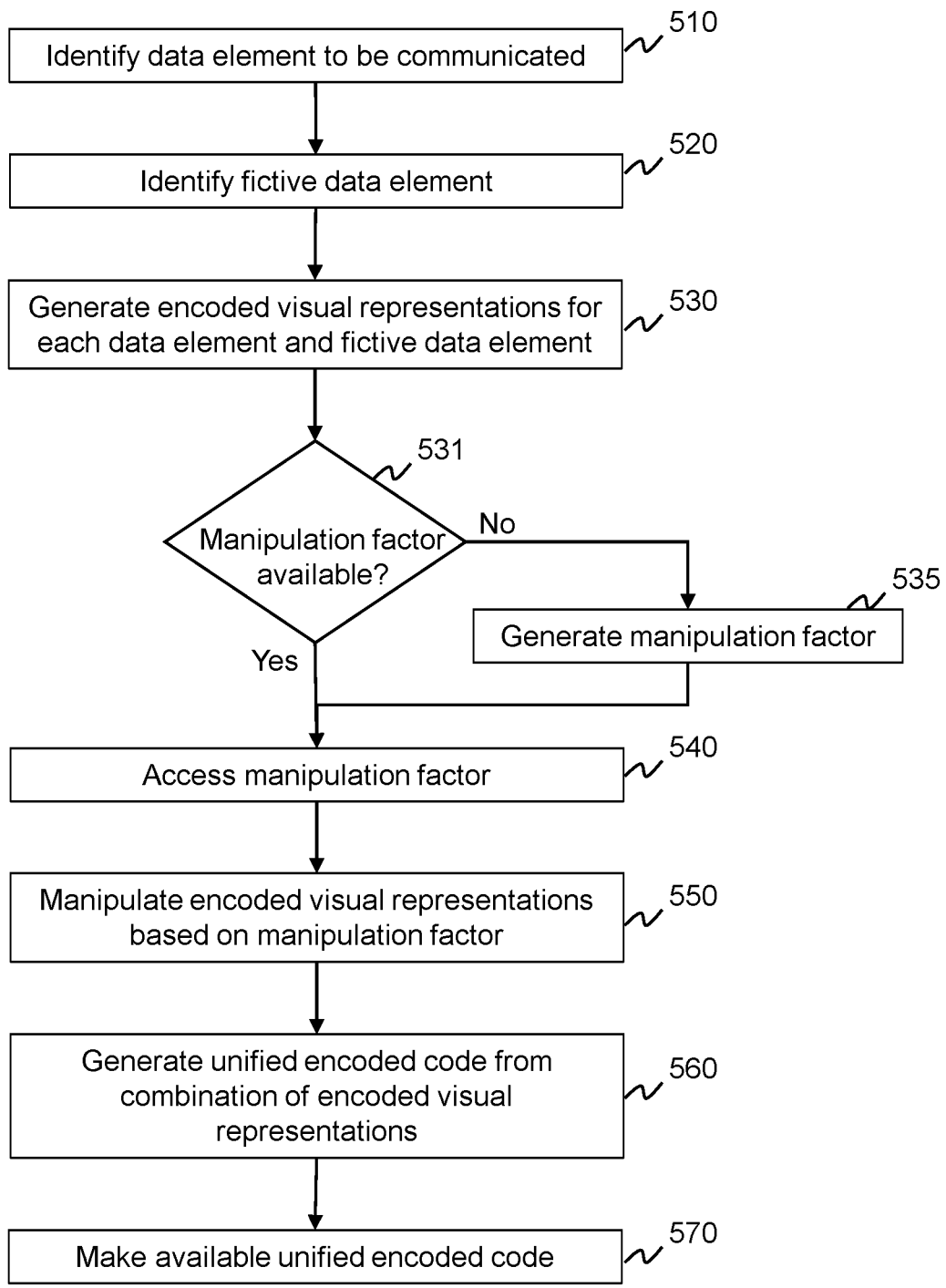
FIG. 5 is a flowchart depicting an exemplary process for a computing device to securely provide data to a scanning device in accordance with disclosed embodiments.

FIG. 5 is a flowchart depicting an exemplary process 500 for securely communicating data from a computing device to a scanning device. Process 500 may be implemented, for example by processor 221, shown in FIG. 2A. Process 500 may correspond to parts of process 400 shown in FIG. 4 and, accordingly, descriptions of the components and processes therein may apply to process 500 as well. As described above, process 500 could be performed in response to a request or command to access data, an application, or a secure location, for example by scanning device 130. Computing device 120 may also trigger process 500 by, for example, sending a request to transfer data to scanning device 130.

At step 510, process 500 may include identifying a data element to be communicated, e.g., data element 410. At step 520, process 500 may include identifying a fictive data element, e.g., fictive data element 420. In some embodiments, process 500 may identify multiple data elements and/or fictive data elements. At step 530, process 500 may generate encoded visual representations, e.g., data encoded visual representation 411 and fictive data encoded visual representation 421, from the data element and fictive data element.

At step 540, process 500 may access one or more manipulation factors 430. As described above, one or more manipulation factors may be preexisting, received from security server 150, or generated by the computing device 120 via the manipulation factor generator 225. Accordingly, process 500 may include the additional substep 531, in some embodiments, of determining whether the manipulation factor is available. If not, computing device 120 may generate the manipulation factor 430 in step 535 using manipulation factor generator 225. In some embodiments, if manipulation factor 430 is not available, computing device 120 may request manipulation factor 430 from security server 150.

At step 550, process 500 may manipulate the encoded visual representations based on the manipulation factor 430. As described above, the computing device 120 may manipulate encoded visual representations to generate manipulated data encoded visual representation 412 and manipulated fictive data encoded visual representation 422. The manipulating, as discussed above, may occur according to various different types of rules. For example, a rule may assign one or more colors to legitimate manipulated data encoded visual representation 412 and one or more other invalid colors to manipulated fictive data encoded visual representation 422. Similarly, one light emitting frequency (e.g., 60 Hz) may be used to express manipulated data encoded visual representation 412 while another frequency (e.g., 90 Hz) may be used to express manipulated fictive data encoded visual representation 422. As a further example, a sound pattern at a given frequency, or with in a particular range (e.g., 1 kHz-2 kHz) may be used to emit manipulated data encoded representation 412 and a second range (e.g., 6 kHz-8 kHz) may be used to emit manipulated fictive data encoded representation 422. Additionally, as discussed above, the manipulation factor 430 may specify how many different fictive data components 420 to generate, and how to manipulate them into manipulated fictive data encoded visual representation 422.

At step 560, process 500 may generate a unified encoded code by combining manipulated encoded visual representations. This may involve overlaying one encoded representation over another, combining portions of the encoded representations, creating a grouping or collection of encoded representations, or other techniques.

At step 570, process 500 may include making available the unified encoded code. As described above, computing device 120 may make available the unified encoded code 440 by electronically transmitting the unified encoded code 440 to scanning device 130. In some embodiments, computing device 120 may make available the unified encoded code 440 for display on display medium 140. Once the unified encoded code 440 is received by scanning device 130, it may be decoded and processed, as discussed below in connection with FIG. 6.

Figure 6:
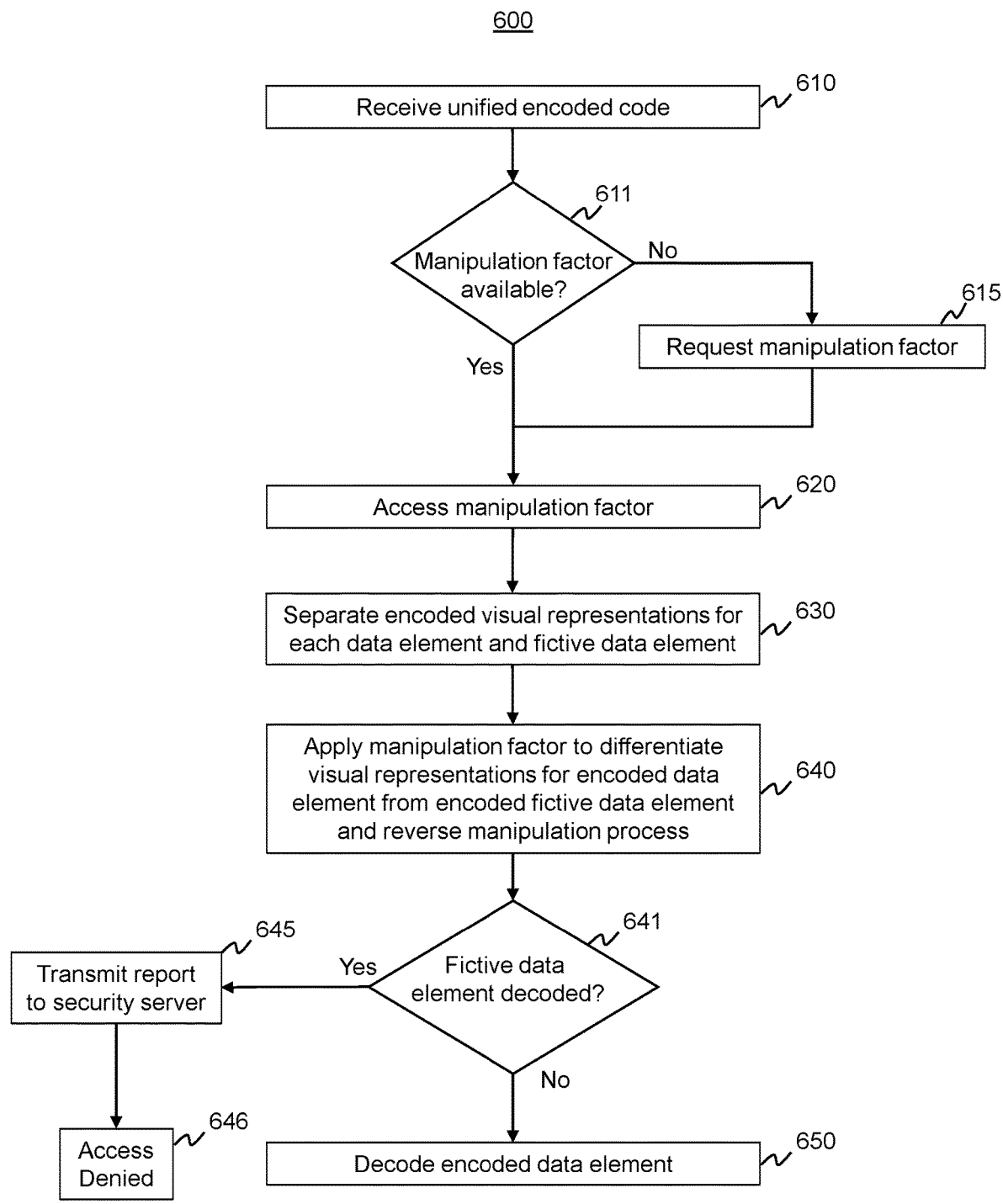
FIG. 6 is a flowchart depicting an exemplary process for a scanning device to securely obtain data from a computing device in accordance with disclosed embodiments.

FIG. 6 is a flowchart depicting an exemplary process 600 for a scanning device 130 to securely receive data from a computing device 120. Process 600 may be implemented, for example by processor 231, shown in FIG. 2B. Process 600 may correspond to parts of process 400 shown in FIG. 4 and, accordingly, descriptions of the components and processes therein may apply to process 600 as well.

At step 610, process 600 may include receiving a unified encoded code 440. In some embodiments, scanning device 130 may receive unified encoded code 440 via electronic transmission. In some embodiments, scanning device 130 may use scanning component 234 to receive unified encoded code 440 (e.g., from display medium 140).

At step 620, process 600 may access one or more manipulation factors 430. As described above, manipulation factor 430 may be preexisting, received from security server 150, received from network 110, or received from computing device 120. Accordingly, process 600 may include the additional substep 611 of determining whether the manipulation factor is available. If not, scanning device 130 may request manipulation factor 430 in step 615 from computing device 120 or security server 150.

At step 630, process 600 may separate the unified encoded code 440 into manipulated encoded visual representations, e.g., manipulated data encoded visual representation 412 and manipulated fictive data encoded visual representation 422. For example, scanning device 130 could separate a multicolor unified encoded code 440 into single-color encoded visual representations, such as 307 and 308 illustrated in FIG. 3. In some embodiments, scanning device 130 may use manipulation factor 430 to separate unified encoded code 440. Scanning device 130 may also use manipulation factor 430 to differentiate between the manipulated encoded visual representations.

At step 640, process 600 may use manipulation factor 430 to reverse the manipulation process conducted by computing device 120 and thus obtain data encoded visual representation 411 and fictive data encoded visual representation 421. In some embodiments, scanning device 130 may not reverse the manipulation process on fictive data encoded visual representation 422. In some embodiments, scanning device 130 may reverse the process on both manipulated encoded visual representations, then use manipulation factor 430 to different data encoded visual representation 411 and fictive data encoded visual representation 421.

In step 641, process 600 may decode fictive data encoded visual representation 421. If process 600 does decode fictive data encoded visual representation 421, process 600 may proceed to optional step 645 in which process 600 transmits a report to security server 150. In some embodiments, security server 150 may then deny access to scanning device in step 646. If process 600 does not decode fictive data encoded visual representation 421, it may proceed to step 650 and decode data encoded visual representation 411 to access data element 410.

FIG. 7 is a block diagram depicting an exemplary process 700 for securely communicating a plurality of data elements from a computing device 120 to a scanning device 130. Process 700 may be triggered in response to a need for scanning device 130 to receive data (e.g., a user of scanning device attempting to access a computer, operating system, application, access-controlled room, vehicle, appliance, etc.). Alternatively, computing device 120 may request to provide data elements to the scanning device 130.

Computing device 120 may identify a plurality of data elements to be communicated, including a first data element 710 and a second data element 720. In some embodiments, the data elements may have different usage contexts. For example, the data elements 710, 720 may correspond to different operations, different applications, different authentication processes for the same application, different steps of an authentication process, etc.

For example, first data element 710 may include a portion of authentication data for use in an authentication process for a first application, and second data element 720 may include a portion of authentication data for use in an authentication process for a second application. In other embodiments, data elements 710 and 720 may include portions of authentication data for use in different phases of an authentication process (e.g., a first phase and a second phase, perhaps in two-factor or multi-factor authentication).

As explained in greater detail below, the plurality of data elements may each be encoded into a different encoded visual representation and then combined into a single unified encoded code 750 that has an ultimate data payload comprising each of the separate data elements. The encoded visual representations, in some embodiments, may be manipulated according to a manipulation factor prior to being combined into unified encoded code 750. In some embodiments, the single unified encoded code may contain data for use in authentication processes for multiple applications, multiple authentication processes for a single application, multiple phases of an authentication process for a single application, etc. Communicating the authentication data in multiple pieces through multiple parts of a unified encoded code adds security to the communication by preventing a malicious user from decoding part of the unified encoded code and accessing all of the data.

In some embodiments, each data element 710, 720 may include dedicated operation-related data corresponding to different operations of an application. For example, a data element may include a specific encryption key or secret corresponding to a certain operation. As an illustration, first data element 710 may contain data corresponding to a first operation (e.g., a software operation) and second data element 720 may contain a secret (e.g., cryptographic token, key, etc.) related to the first operation. Likewise, a third data element may contain data corresponding to a second operation and a fourth data element may contain a secret related to the second operation, and so on. As explained in greater detail below, the plurality of data elements may each be encoded into a different encoded visual representation and then combined into a single unified encoded code 750 with an ultimate data payload comprising each of the separate data elements corresponding to multiple operations and multiple secrets.

Data elements 710 and 720 may also include code segments, in some embodiments. For example, first data element 710 may include a first code segment (e.g., for performing a software operation) and second data element 720 may include a second code segment (e.g., for performing a different software operation). In some embodiments, additional data elements may include additional code segments. As explained in greater detail below, the plurality of data elements may each be encoded into a different encoded visual representation, manipulated, and then combined into a single unified encoded code 750 with an ultimate data payload comprising each of the separate code segments. In some embodiments, the code segments may be related such that when combined they form a functional section of code. In some embodiments, the multiple code segments alone may not be functional individually but may be functional when combined. The communication of the functioning code may therefore be more secure because a malicious user capable of decoding part of the code will not be able to use the code without correctly decoding all of the encoded visual representations corresponding to the multiple code segments.

In other embodiments, the data elements 710 and 720 may individually comprise specific data payloads for use in different contexts. For example, first data element 710 may be an authentication data payload including data for different authentication processes of a single application or authentication processes for multiple applications. Second data element 720 may then be a data payload of multiple pieces of data relating to two or more different operations. For example, the data payload of second data element 720 may comprise data for a first operation, a secret corresponding to the first operation, data for a second operation, and a secret corresponding to the second operation. In this way, computing device 120 may communicate multiple sets of data with different uses simultaneously. As explained in further detail below, computing device 120 is able to achieve such simultaneous communication through the use of unified encoded code 750.

Computing device 120 may generate a first encoded visual representation 711 and a second encoded visual representation 721, corresponding to first data element 710 and second data element 720, respectively. Encoded visual representations 711 and 721 may be, for example, QR codes, barcodes, encoded images, or other forms of visual representation as described with respect to FIG. 3. Alternatively, the encoded representations 711, 721 may be non-visual (e.g., audible tones, vibrations, temperatures, etc., as discussed above). In some embodiments, computing device 120 may encrypt data elements 710 and 720 before generating data encoded visual representations 711 and 721. In some embodiments, computing device 120 may separate data elements 710 or 720 into a plurality of sub-elements. The computing device 120 may then generate an encoded visual representation corresponding to each of the plurality of sub-elements.

In some embodiments, where the data elements correspond to data payloads with data for use in different contexts, encoded visual representations 711 and 721 may include the different data payloads. For example, if first data element 710 comprises an authentication data payload with data for different authentication processes of a single application, encoded visual representation 711 may include the entire authentication data payload of first data element 710. Likewise, if second data element 720 includes a data payload of multiple pieces of data relating to two or more different operations, the second encoded visual representation may contain the entire operations data payload of second data element 720.

Computing device 120 may access a plurality of manipulation factors, for example, a first manipulation factor 730 and a second manipulation factor 740. In some embodiments first manipulation factor 730 and second manipulation factor 740 may be unique. In other embodiments, first manipulation factor 730 and second manipulation factor 740 may be the same. As described above with respect to FIG. 4, manipulation factors 730 and 740 may comprise a secret encrypted with a certificate associated with an identity, a rule based on time, a rule based on location, a color sequence rule, a color pattern rule, a light frequency rule, a three-dimensional rule, a vibration-based rule, or a heat-based rule, etc. In some embodiments, manipulation factors 730 and 740 may be defined by a common manipulation scheme. For example, the manipulation factors could correspond to different colors, color sequences, frequencies, or frequency ranges, etc.

Computing device 120 may be configured to generate one or more manipulation factors. In some embodiments, security server 150 may generate one or more manipulation factors. Security server 150 may then transmit one or more manipulation factors to computing device 120. In some embodiments, manipulation factors 730 and 740 may be defined in advance of identifying data elements 710 and 720. In some embodiments, manipulation factors 730 and 740 may be defined on-demand after identifying data elements 710 and 720. In some embodiments, manipulation factor 730 and 740 may be dynamically configurable by security server 150.

Manipulation factors 730 and 740 may be used by computing device 120 to implement a reversible process to convert encoded visual representations into manipulated encoded visual representations. For example, computing device 120 may use first manipulation factor 730 to manipulate first encoded visual representation 711 to generate first manipulated encoded visual representation 712. Similarly, computing device 120 may use second manipulation factor 740 to manipulate second data encoded visual representation 721 to generate second manipulated data encoded visual representation 722. As shown in FIG. 7, the manipulated encoded visual representations may be generated such that they have different colors, different combinations of colors, etc. For example, first manipulated data encoded visual representation 712 may be blue and white, while second manipulated data encoded visual representation 722 may be red and white. Alternatively, as discussed above, the manipulation may involve changing the content of the encoded representations as well.

Computing device 120 may then make first manipulated encoded visual representation 712 and second manipulated encoded visual representation 722 available for decoding, for example by electronically transmitting the manipulated encoded visual representations to scanning device 130. In some embodiments, computing device 130 may transmit the manipulated encoded visual representations to security server 150. In some embodiments, computing device 120 may cause the manipulated encoded visual representations to be visually displayed on display medium 140.

Scanning device 130 may then receive the manipulated encoded visual representations. In some embodiments, scanning device 130 may receive the manipulated encoded visual representations by scanning, via scanning component 234, the manipulated visual representations (e.g., from display medium 140). In other embodiments, scanning device 130 may receive the manipulated visual representations via electronic transmission from computing device 120 or security server 150. Scanning device 130 may then use first manipulation factor 730 to reverse the manipulation process and decode first manipulated encoded visual representation 712 to yield first data element 710. Likewise, scanning device 130 may use second manipulation factor 740 to reverse the manipulation process and decode second manipulated encoded visual representation 722 to yield first data element 720.

In some embodiments, computing device 120 may combine first manipulated data encoded visual representation 712 with second manipulated data encoded visual representation 722 to generate unified encoded code 750. Unified encoded code 750 may be a visual representation comprising two overlaid or merged encoded visual representations, for example a multicolor combined code 309 as illustrated in FIG. 3. Computing device 120 may then make unified encoded code 750 available for decoding, for example by electronically transmitting unified encoded code 750 to scanning device 130. In some embodiments, computing device 120 may cause unified encoded code 750 to be visually displayed on display medium 140. In other embodiments, computing device 120 may transmit unified encoded code 750 to security server 150.

In other embodiments, computing device 120 may make encoded visual representations 712 and 722 available for decoding without manipulating them. Computing device 120 may also combine the non-manipulated encoded visual representations 712 and 722 into a unified encoded code 750, which computing device 120 may then make available for decoding. In both cases, scanning device 130 may receive the same information as in the manipulated embodiments described above, but in a non-manipulated encoded form. In some embodiments, the non-manipulated encoded visual representations may be generated such that they have different colors, different combinations of colors, etc. For example, first data encoded visual representation 711 may be green and white, while second data encoded visual representation 721 may be black and white. In some embodiments, the multiple colored encoded visual representations may be combined into a single multicolor encoded visual representation, which computing device 120 may make available for decoding.

Scanning device 130 may receive unified encoded code 750 from computing device 120. In some embodiments, scanning device 130 may receive unified encoded code 750 from computing device 120 via electronic transmission. In some embodiments, scanning device 130 may receive unified encoded code 750 via scanning component 234. Scanning component 234 may scan unified encoded code 750 when displayed on display medium 140. In other embodiments, scanning device 130 may receive unified encoded code 750 from security server 150. Scanning device 130 may be configured to separate unified encoded code 750 into first manipulated data encoded visual representation 712 and second manipulated data encoded visual representation 722. For example, scanning device 130 could separate unified encoded code 440 into single-color encoded visual representations, such as those illustrated in FIG. 3.

In some embodiments, scanning device 130 may use manipulation factors 730 and 740 to separate unified encoded code 750. Manipulation factors 730 and 740 may be preexisting, received from computing device 120, received from network 110, or received from security server 150. Scanning device 130 may also use manipulation factors 730 and 740 to differentiate between the manipulated encoded visual representations.

In some embodiments, scanning device 130 may use manipulation factors 730 and 740 to reverse the manipulation process conducted by computing device 120 and thus obtain first encoded visual representation 711 and second encoded visual representation 721. After obtaining first encoded visual representation 711, scanning device 130 may access first data element 710 by decoding first encoded visual representation 711. Likewise, scanning device 130 may access second data element 720 by decoding second encoded visual representation 721. In some embodiments, if data elements 710 and 720 were separated into sub-elements, scanning device 130 may access data elements 710 and 720 by decoding the encoded visual representation of each sub-element and recombining the decoded sub-elements.

Once scanning device 130 accesses the data elements, it may use the data elements. In some embodiments, scanning device 130 may use the data elements in different contexts. For example, scanning device 130 may use first data element 710 in a first phase of an authentication process and use second data element 720 in a second phase of an authentication process (e.g., potentially an out-of-band or two-factor authentication process). In other embodiments, the scanning device 130 may use first data element 710 in an authentication process for a first application and use second data element 720 in an authentication process for a second application (e.g., a separate or unrelated application). In other embodiments, the data elements may comprise data payloads including multiple pieces of data. For example, first data element 710 may include several pieces of data relating to authentication processes and second data element 720 may contain a series of code segments. In this case, scanning device 130 may use the data payloads in their respective use contexts after decoding the data elements 710 and 720.

Figure 8:
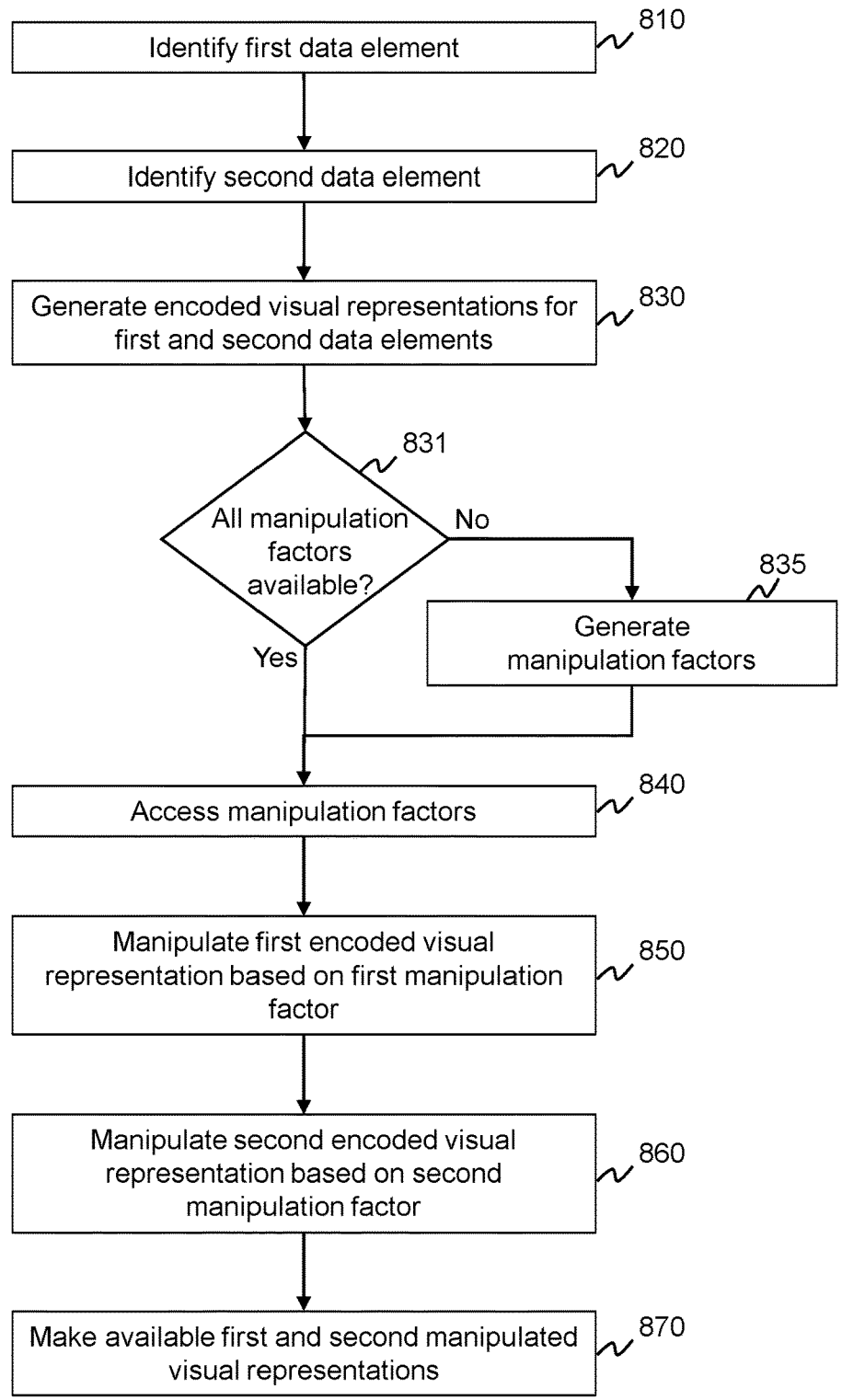
FIG. 8 is a flowchart depicting an exemplary process for a computing device to securely provide data to a scanning device in accordance with disclosed embodiments.

FIG. 8 is a flowchart depicting an exemplary process 800 for securely communicating a plurality of data elements from a computing device to a scanning device. Process 800 may be implemented, for example by processor 221, shown in FIG. 2A. Process 800 may correspond to parts of process 700 shown in FIG. 7 and, accordingly, descriptions of the components and processes therein may apply to process 800 as well. As described above, process 800 could be made in response to a request or command to access data, for example by scanning device 130. Computing device 120 may also trigger process 800 by, for example, sending a request to transfer data to scanning device 130.

At step 810, process 800 may include identifying a first data element to be communicated, e.g., data element 710. Likewise, at step 820, process 800 may include identifying a second data element, e.g., data element 720. The two different data elements may be completely unrelated (e.g., operating in two unrelated contexts) or may be related as performing different roles or processes that are interrelated (e.g., two phases of an authentication process). At step 830, process 800 may generate encoded visual representations, e.g., data encoded visual representation 711 and fictive data encoded visual representation 721, from the data elements.

At step 840, process 800 may access multiple manipulation factors (e.g., manipulation factors 730 and 740, and/or others). In some embodiments, manipulation factors 730 and 740 may be the same or different. As described above, manipulation factors may be preexisting, received from security server 150, or generated by the computing device 120 via the manipulation factor generator 225. Accordingly, process 800 may include the additional substep 831 of determining whether the manipulation factors are available. If not, computing device 120 may generate the manipulation factors in step 835 using manipulation factor generator 225. In some embodiments, if manipulation factors are not available, computing device 120 may request manipulation factors from security server 150.

At step 850, process 800 may manipulate first encoded visual representation 711 based on the first manipulation factor. As described above, the computing device 120 may manipulate encoded visual representation 711 to generate first manipulated encoded visual representation 712. Likewise, at step 860, process 800 may manipulate second encoded visual representation 721 to generate second manipulated encoded visual representation 722.

At step 870, process 800 may make available for decoding the first and second manipulated encoded visual representations. As described above, computing device 120 may make manipulated encoded visual representations available by electronically transmitting them to scanning device 130. In some embodiments, computing device 120 may make manipulated encoded visual representations 712 and 722 available for display on display medium 140.

In some embodiments, process 800 may generate a unified encoded code 750 by combining manipulated encoded visual representations 712 and 722. Then process 800 may make available for decoding unified encoded code 750. The scanning device 130 may then receive, decode, and process the unified encoded code 750 as discussed below.

Figure 9:
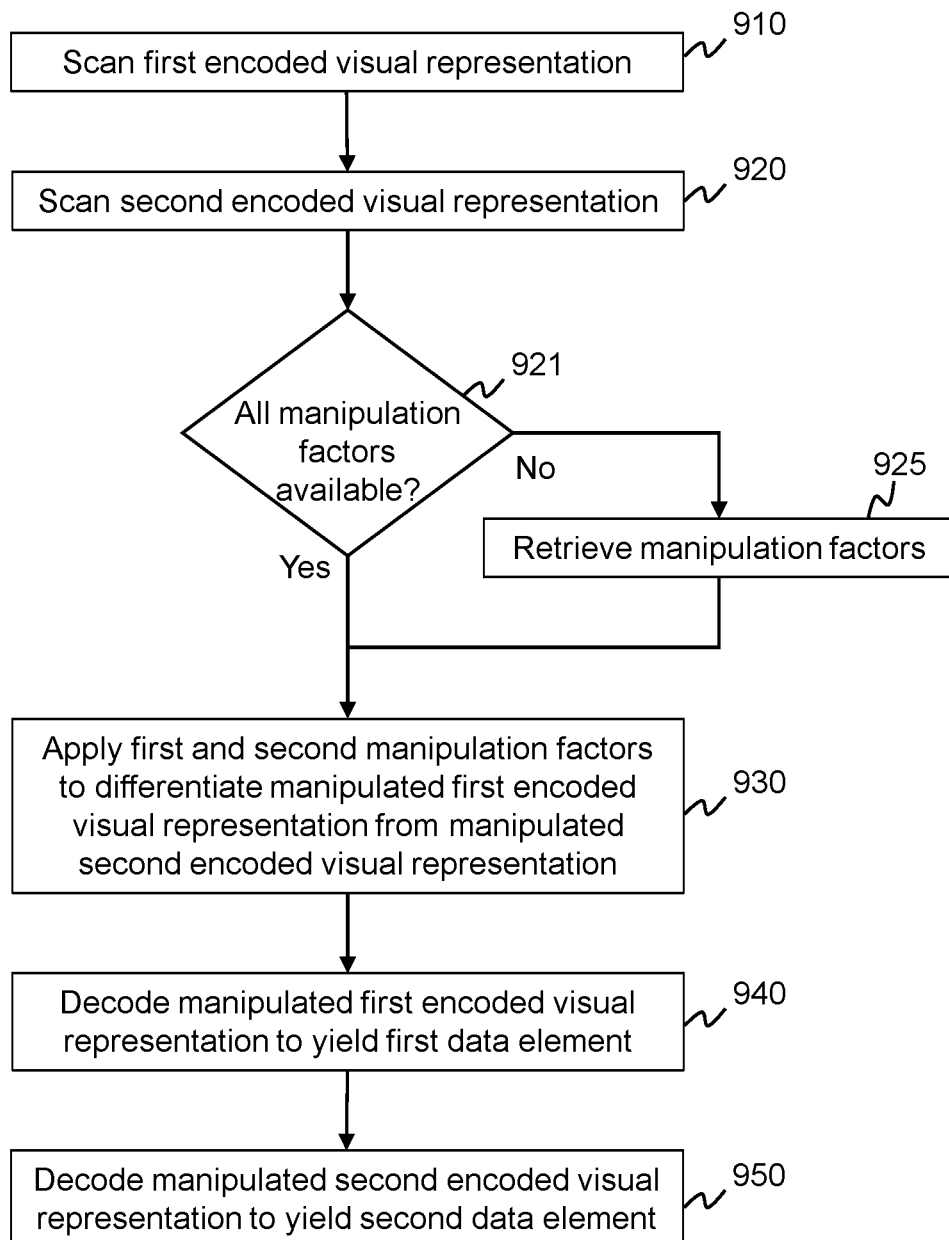
FIG. 9 is a flowchart depicting an exemplary process for a scanning device to securely obtain data from a computing device in accordance with disclosed embodiments.

FIG. 9 is a flowchart depicting an exemplary process 900 for a scanning device 130 to securely receive data from a computing device 120. Process 900 may be implemented, for example by processor 231, shown in FIG. 2B. Process 900 may correspond to parts of process 700 shown in FIG. 7 and, accordingly, descriptions of the components and processes therein may apply to process 900 as well.

At step 910, process 900 may scan a first encoded visual representation. For example, scanning device 130 may use scanning component 234 to scan first manipulated encoded visual representation 712. In other embodiments, process 900 may start by scanning device 130 receiving first manipulated encoded visual representation 712 via electronic transmission from computing device 120 or security server 150.

Similarly, in step 920, process 900 may scan a second encoded visual representation, for example second manipulated encoded visual representation 722. Like step 910, step 920 may include scanning device 130 using scanning component 234 to scan second manipulated encoded visual representation 722. Scanning device 130 may also receive second manipulated encoded visual representation 722 by electronic transmission.

At step 921, process 900 may access one or more manipulation factors 730 and 740. As described above, manipulation factors may be preexisting, received from security server 150, received from network 110, or received from computing device 120. Accordingly, process 900 may include the additional substep 925 of retrieving the manipulation factors. Process 900 may cause scanning device 130 to request manipulation factors 730 and 740 from computing device 120 or security server 150.

In other embodiments, process 900 may include receiving a unified encoded code 750. In some embodiments, scanning device 130 may receive unified encoded code 750 via electronic transmission. In other embodiments, scanning device 130 may scan unified encoded code 750. Process 900 may then separate the unified encoded code 750 into the first and second manipulated visual representations. For example, scanning device 130 could separate a multicolor unified encoded code 750 into single-color encoded visual representations, such as those illustrated in FIG. 3. In some embodiments, process 900 may use manipulation factors 730 and 740 to separate the unified encoded code 750 into first and second manipulated encoded visual representations 712 and 722.

At step 930, process 900 may use manipulation factors 730 and 740 to differentiate between first manipulated encoded visual representation 712 and second manipulated encoded visual representation 722. Once the manipulated encoded visual representations are differentiated, in step 940, process 900 may apply first manipulation factor 730 to first manipulated encoded visual representation 712 to reverse the manipulation process conducted by computing device 120 and thus obtain first encoded visual representation 711. Then, first encoded visual representation 711 may be decoded to yield first data element 710. Likewise, in step 950 process 900 may apply second manipulation factor 740 to second manipulated encoded visual representation 722 to obtain second encoded visual representation 721. Then, second encoded visual representation 721 may be decoded to yield second data element 720.

Various potential use cases of the disclosed embodiments are described below. It is understood that these cases are provided by way of example only and are not limiting of the present disclosure.

One potential implementation may be to facilitate authorization of a user when logging in to an operating system. For example, a user may wish to log in to a computing device and access its operating system. The computing device may request authorization and/or authentication of the user before granting access to the operating system. This authorization and/or authentication may occur, for example, by having the user access a certain network location or by transferring a password encrypted with a specific key. Based upon the request for access by a user, the computing device may identify data, for example the network link or an encryption/decryption key, to communicate to the user. The computing device may also identify fictive data to communicate along with the actual data. The fictive data may be such that when accessed, it causes a report to be sent to a security server (e.g., based on an embedded URL). The security server may then deny the user access to the operating system in that event.

The computer device may then generate a scannable encoded code comprising the actual data and the fictive data. Once the code is generated, the computing device may display it to the user. The user may then use his or her scanning device, e.g. a smart phone, to scan and decode the code. The scanning device may access a preexisting manipulation factor or receive a manipulation factor from a security server. The manipulation factor may permit the scanning device to decode the scannable code and differentiate between the actual data and the fictive data.

The user's scanning device may then access the data and then complete, using the data, the authorization to gain access to the operating system. For example, the scanning device may access the network location via the link sent in the scannable code. If the scanning device accesses the fictive data, however, the fictive data may cause the scanning device to send a security report to the security server. The fictive data may also cause the user's request for access to be denied. Thus, using the scannable code with both actual data and fictive data, the computing device may securely authorize access to an operating system using the disclosed embodiments.

Another possible implementation is granting a user physical access to an access-controlled space, for example, unlocking a locked door. The locked door may be a door in a secure building or a door of a shared vehicle. Similar to the previous example, a user may request access to the space, e.g. that the door be unlocked. In response to this request, a computing device associated with the lock may request authorization of the user before granting access. This authorization may occur, for example, by having the user's scanning device communicate a password encrypted with a specific key. Based upon the request for access by a user, the computing device may identify data, for example the encryption key or password, to communicate to the user. The computer may also identify fictive data to communicate along with the actual data. The fictive data may be such that when decoded, it denies access to the user (e.g., based on an embedded URL).

The computer device may then generate a scannable encoded code comprising the actual data and the fictive data. Once the code is generated, the computer device may display it to the user. The user may then use his or her scanning device, e.g. a smart phone, to scan the code. The scanning device may then access a preexisting manipulation factor. The manipulation factor may permit the scanning device to decode the scannable code and differentiate between the actual data and the fictive data. Once the code is decoded, the user's scanning device may then access the data. Using the data, the scanning device may complete the authorization process and give the user access by unlocking the door. For example, the scanning device may encrypt a password with an encryption key sent in the scannable code and transmit the encrypted password to the computing device for verification. If the scanning device accesses the fictive data, however, the fictive data may cause the scanning device to be denied access and prevent the door from unlocking. Thus, using the scannable code with both actual data and fictive data, the computing device may securely authorize access to a restricted physical area using the disclosed embodiments.

In yet another potential implementation, a computing device may securely transfer data to a scanning device to gain access to a financial system. The financial system may be associated with a bank, credit card provider, etc. For example, an individual may wish to log in to his or her bank account at an ATM via a computing device, e.g., a smart phone. The smart phone may access multiple data elements corresponding to a login authorization process. For example, a first credential element and a second credential element. The smart phone may also receive multiple manipulation factors from the bank's security server. The manipulation factors may be dynamically configurable such that security server changes the manipulation factors after every login attempt. The smart phone may use the manipulation factors to create an encoded scannable code for each data element corresponding to the login authorization process. For example, the smart phone may generate a scannable code corresponding to a first credential element and a second scannable code corresponding to a second credential element. The smart phone may then display the two unique codes on its screen.

The bank ATM may include a scanning device that can read the scannable code. The user may scan the codes displayed on the smart phone's screen with the ATM scanner. In response to the scanning, the ATM may request the manipulation factors from the security server. The ATM may then decode the codes and receive the first and second credential elements. If the credential elements are correct, the ATM may grant system access to the user. Thus, using the multiple scannable codes corresponding to multiple data elements, a computing device may securely gain access to a financial account using the disclosed embodiments.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for generating and communicating multi-context encoded visual representations of data, the operations comprising:
 identifying a first data element having a first usage context;
 identifying a second data element having a second usage context different from the first usage context;
 generating a first encoded visual representation of the first data element;
 manipulating the first encoded visual representation of the first data element according to a first manipulation factor;
 generating a second encoded visual representation of the second data element;
 manipulating the second encoded visual representation of the second data element according to a second manipulation factor; and
 making available, for decoding, the manipulated first and second encoded visual representations;
 wherein at least one of the first or second manipulation factors defines at least one of: at least one color, a color sequence, or a display frequency to use for at least one of the first or second encoded visual representations.

2. The non-transitory computer readable medium of claim 1, wherein the first data element includes at least a portion of authentication data for use in an authentication process for a first application.

3. The non-transitory computer readable medium of claim 2, wherein the second data element includes at least a portion of authentication data for use in an authentication process for a second application.

4. The non-transitory computer readable medium of claim 1, wherein the first data element includes application data for use by a first application.

5. The non-transitory computer readable medium of claim 4, wherein the second data element includes application data for use by a second application.

6. The non-transitory computer readable medium of claim 1, wherein the first data element includes a first code segment.

7. The non-transitory computer readable medium of claim 6, wherein the second data element includes a second code segment.

8. The non-transitory computer readable medium of claim 1, wherein the first data element includes at least a portion of authentication data for use in a first phase of an authentication process.

9. The non-transitory computer readable medium of claim 8, wherein the second data element includes at least a portion of authentication data for use in a second phase of the authentication process.

10. The non-transitory computer readable medium of claim 1, wherein the first data element includes first application data for use by a first operation of an application, and the second data element includes second application data for use by a second operation of the application.

11. A computer-implemented method for receiving and decoding multi-context encoded visual representations of data, the method comprising:
   scanning, at a personal computing device, a manipulated first encoded visual representation of a first data element, the manipulation having been performed according to a first manipulation factor;
   scanning, at the personal computing device, a manipulated second encoded visual representation of a second data element, the manipulation having been performed according to a second manipulation factor;
   applying, at the personal computing device, the first and second manipulation factors to separate the manipulated first encoded visual representation from the manipulated second encoded visual representation;
   decoding, at the personal computing device, the manipulated first encoded visual representation to yield the first data element;
   decoding, at the personal computing device, the manipulated second encoded visual representation to yield the second data element;
   utilizing the first data element in a first usage context; and
   utilizing the second data element in a second usage context;
   wherein at least one of the first or second manipulation factors defines at least one of: at least one color, a color sequence, or a display frequency to use for at least one of the first or second encoded visual representations.

12. The computer-implemented method of claim 11, wherein the first and second manipulation factors are defined by a common manipulation scheme.

13. The computer-implemented method of claim 11, further comprising receiving, from a security server, the first and second manipulation factors.

14. The computer-implemented method of claim 13, wherein the manipulated first and second encoded visual representations are made available for the scanning by the personal computing device from the security server.

15. A computer-implemented method for receiving and decoding multi-context encoded visual representations of data, the method comprising:
   scanning, at a personal computing device, a manipulated first encoded visual representation of a first data element, the manipulation having been performed according to a first manipulation factor;
   scanning, at the personal computing device, a manipulated second encoded visual representation of a second data element, the manipulation having been performed according to a second manipulation factor;
   applying, at the personal computing device, the first and second manipulation factors to separate the manipulated first encoded visual representation from the manipulated second encoded visual representation;
   decoding, at the personal computing device, the manipulated first encoded visual representation to yield the first data element;
   decoding, at the personal computing device, the manipulated second encoded visual representation to yield the second data element;
   utilizing the first data element in a first usage context; and
   utilizing the second data element in a second usage context;
   wherein before the scanning of the manipulated first and second encoded visual representations, the first and second encoded visual representations are received as a single composite encoded visual representation.

16. The computer-implemented method of claim 15, further comprising separating the manipulated first and second encoded visual representations from each other, from the single composite encoded visual representation.

17. The computer-implemented method of claim 16, wherein the separating is performed based on the first and second manipulation factors.

* * * * *